United States Patent [19]

Davis et al.

[11] 4,355,277

[45] Oct. 19, 1982

[54] DUAL MODE DC/DC CONVERTER

[75] Inventors: Walter L. Davis, Plantation; James E. Jacobson, Jr., Ft. Lauderdale, both of Fla.

[73] Assignee: Motorola, Inc., Ft. Lauderdale, Fla.

[21] Appl. No.: 192,778

[22] Filed: Oct. 1, 1980

[51] Int. Cl.³ .............................................. H02M 3/335
[52] U.S. Cl. .................................... 323/351; 323/222; 323/285; 363/21; 363/97
[58] Field of Search ..................................... 363/18–21, 363/41, 97, 124, 131–134; 323/222, 282–290, 349–351; 307/24, 29, 31–35, 38–41, 80–81

[56] References Cited
U.S. PATENT DOCUMENTS

| 3,579,090 | 5/1971 | Madsen | 323/284 |
| 3,636,381 | 1/1972 | Press | 323/351 X |
| 4,030,015 | 6/1977 | Herko et al. | 363/41 |
| 4,155,112 | 5/1979 | Miller et al. | 363/21 |

Primary Examiner—William M. Shoop
Assistant Examiner—Peter S. Wong
Attorney, Agent, or Firm—Joseph T. Downey; Edward M. Roney; James W. Gillman

[57] ABSTRACT

A DC/DC converter operates at peak efficiency in either of two output current level states in response to the power demands of an associated electronic device, thereby reducing wasted current to a minimum. The converter is designed to operate from a one-cell battery, and is particularly suited to an integrated circuit implementation.

20 Claims, 8 Drawing Figures

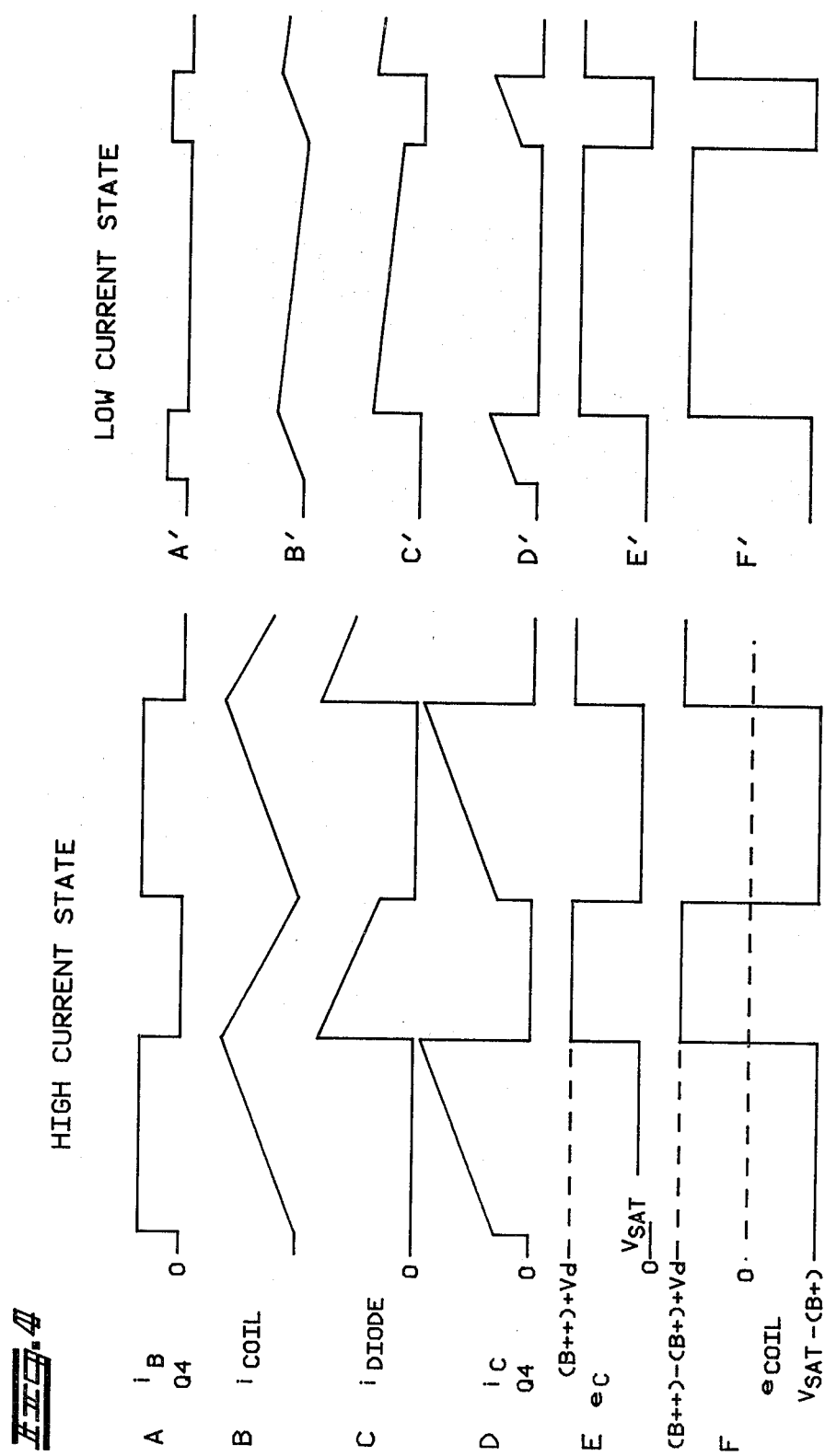

DUAL MODE DC/DC CONVERTER

BACKGROUND OF THE INVENTION

This invention relates to the field of DC/DC converters and, more particularly, to a converter which can operate at maximum efficiency at two different output current demand levels.

DC/DC converters are widely used in systems requiring voltages higher than the power supply or battery can provide, and it is well known that a semiconductor switch responding to a pulse width modulated input signal can be used to supply current to an inductor/diode/filter combination to generate a DC voltage which is higher than the B+ supply. Such circuits usually are designed for maximum efficiency at the maximum expected current output, thus the power used to drive the switch is optimized for that maximum current. If the required output current is less than that maximum, drive power is wasted which results in very inefficient operation and the possible degradation of the converter. In some known converters, the excess drive current is "dumped" into a "sink" circuit which improves the quality of the operation, but this approach is wasteful of power.

Also, prior art converters have typically required B+ supplies of a much higher voltage than is typically available in personal electronic products such as pocket pagers. The presently known DC to DC conversion techniques are not well suited for use in portable battery operated equipment, such as paging receivers, where the power source is a small, low voltage battery. In such applications, it is highly desirable to minimize the power drain from the battery to provide acceptable and economical battery life while keeping the physical size of the battery small.

Thus, the prior art approaches are particularly ill-suited for applications where the output load of the converter is switched between two drastically different demand levels, as for example, is the case when a CMOS microcomputer paging decoder is cycled between a high drain, fully operational mode and a reduced drain standby mode. Here, the power saving benefits of the switched mode operation of the microcomputer can only be fully realized if the DC/DC converter operates with high efficiency under the two different load conditions.

SUMMARY OF THE INVENTION

It is therefore an object of the present invention to provide a dual power level DC/DC converter which operates with maximum efficiency at each level.

It is another object to provide a converter which ensures the appropriate amount of power for each power demand mode of operation of the associated electronic device.

It is another object to provide a DC/DC converter which can operate from a one cell battery.

These and other objects which will become apparent are provided in a circuit in accordance with the invention wherein a power supply at a first voltage energizes a coil which is coupled to an output terminal. A switching means interrupts current flow to the coil and diverts the energy in the coil to a capacitor at the output terminal. The switching means is controlled by the current supplied to the base of a switching transistor. Two current supplying sources are coupled to the base of the transistor. An internal control signal switches both of the current supplying sources on a variable duty cycle basis in response to the power demand at the output terminal. One of the current supply sources is selectively connected to add current to the base of the switching transistor in response to a predetermined input signal level. The output signal is at a second voltage which is greater than the first voltage. Thus, at the output terminal, current is available at two separate maximum levels in response to the needs of the associated device.

BRIEF DESCRIPTION OF THE DRAWING

FIGS. 4A to 4F are waveform charts relating to the diagram of FIG. 3.

DETAILED DESCRIPTION OF A PREFERRED EMBODIMENT

Figure 1:
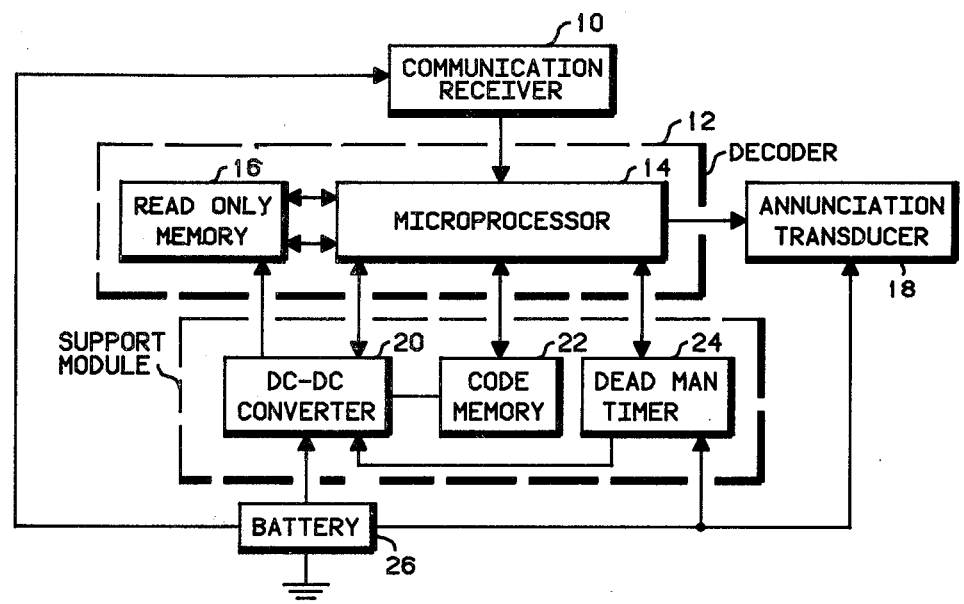
FIG. 1 is a block diagram illustrating the use of the invention in a personal communications receiver.

FIG. 1 shows a functional diagram of a paging receiver utilizing the present invention. Specifically, a communications receiver 10 is connected to a selective signalling decoder 12 which comprises a microprocessor 14 and a read-only memory 16. The decoder 12 is further interconnected with an annunciation transducer 18, a DC/DC converter 20, a code memory 22 and a deadman timer 24.

The receiver 10, the DC/DC converter 20, and the deadman timer 24 are directly connected to a battery 26, which powers the operation of these blocks and is the energy source for the DC/DC converter 20. The DC/DC converter 20 generates the power levels required for the operation of the microprocessor and the code memory 22.

In operation, the communications receiver 10 recovers signals transmitted over a communications channel and supplies that signal to the decoder 12 which includes the microprocessor 14. The microprocessor decodes the recovered signal by determining if it contains a data pattern equivalent to one of the one or more signal patterns stored in code memory 22. If a pattern match is detected, the microprocessor activates the annunciation transducer 18 and causes an appropriate alert signal to be generated to inform the user that a paging signal has been received.

In order to minimize the drain from the battery 26, the microprocessor is operated in two modes: a high power drain, fully operational mode in which it can decode signals in real time; and a reduced power drain, reduced computational ability mode in which it merely times the interval to the next transition to the high drain state. To take full advantage of the power saving, dual mode operation of the microprocessor, the DC/DC converter power source 20 also has two operational states that correspond to the two modes of the microprocessor. That is, the converter 20 has a high output state in which it can supply the power required to operate the decoder in its high power drain mode, and a reduced output state in which it can supply the power required to operate the decoder in its low power drain mode.

Thus, in its low power output state, DC/DC converter 20 is adjusted to supply a greatly diminished power level with maximum efficiency. When the converter is in its low output state, it cannot support the fully operational mode of the microprocessor.

During the normal operation of the system, the microprocessor controls the operation of the DC/DC converter 20 and switches the output state of the converter in accordance with its power demands. A control input from the deadman time 24 is also connected to the converter 20, and this signal path places the converter in the high output state if the microprocessor should experience a program execution failure and require reinitialization.

Figure 2:
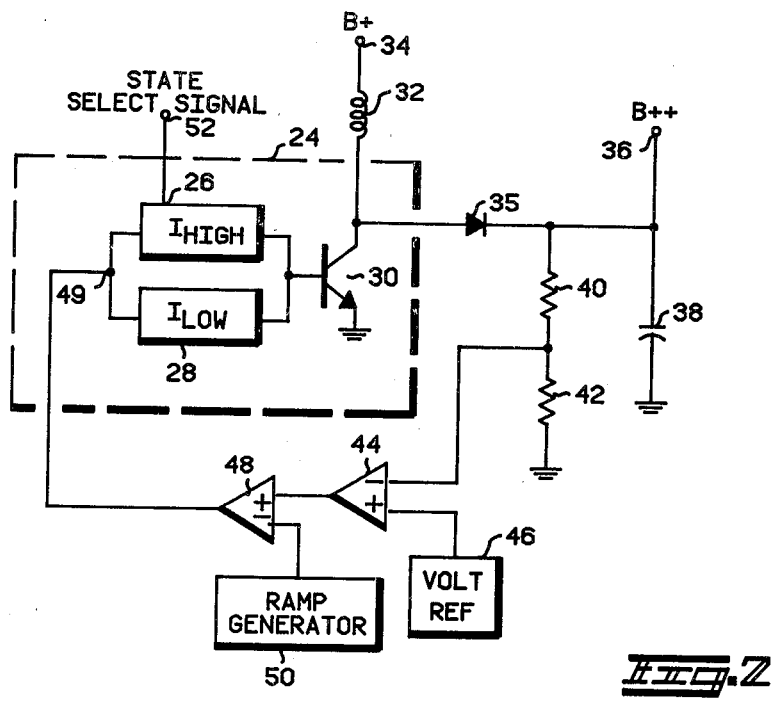
FIG. 2 is a block diagram illustrating the present invention.

The diagram shown in FIG. 2 shows basic elements of the present invention and corresponds to a detailed diagram for the DC/DC converter block labeled 20 in FIG. 1. The diagram of FIG. 2 could form a part of any electronic device which normally operates at two distinct load current demand levels but it is particularly adapted for use with a miniature device such as a personal pager which requires only one battery cell, and must conserve energy. In FIG. 2, a coil driver circuit 24 shown enclosed by a broken line includes high and low circuit sources 26 and 28 connected to the base of a switching transistor 30. Transistor 30 has its emitter connected to ground and its collector connected to enable a coil 32 to be energized by a B+ supply terminal 34, which may be a 1.3 volt cell. The coil driver circuit 24 is also coupled to the anode of a diode 35. A B++ output terminal 36 is connected to the cathode of diode 35 and to the load circuitry (not shown). The output voltage at terminal 36 will be the required multiple of the B+ voltage. A capacitor 38 is coupled between the B++ supply 36 and and ground to help provide a filtering function. The B++ supply is also coupled to a divider circuit comprising series resistors 40 and 42. The divided-down voltage at the interconnection between resistors 40 and 42 is coupled to the negative input of an error amplifier 44. A reference voltage source 46 is connected to the positive input terminal of amplifier 44. The error amplifier 44 compares the divided-down voltage with a reference voltage from voltage reference source 46, amplifies the the difference, and couples this error voltage to the positive input terminal of a comparator 48. It will be apparent that changing the reference voltage 46 will, within limits, change the B++ voltage. A ramp generator 50 is connected to the negative input terminal of comparator 48. The ramp generator 50 provides a saw tooth signal at a predetermined frequency as will be discussed further below. The comparator 48 switches at a point on the ramp or saw tooth signal determined by the error signal from the amplifier 44.

The output of the comparator 48 is coupled to the coil driver circuit 24 via a terminal 49 and is a pulse width modulated (PWM) signal in which the width of the pulse is determined by how closely the output voltage level matches the desired output level. Also coupled to the coil driver circuit 24 is a state select signal, from a state select input terminal 52. This signal selectively actuates high current source 26 to control the magnitude of current available for energizing the coil 32, and thus the power state of DC/DC converter 20, in response to the modes of operation of the associated electronic device.

The mode select signal at the terminal 52 will be a two-level or binary signal. A "high" or "one" level signal indicates that the DC/DC converter 20 is required to establish a high power state to provide a relatively high level of output current, and a "low" or "zero" level, indicates that considerably less current is to be required from the converter and thus the low power state of converter 20 will be established. It will be apparent that, if more than two different current levels are required for a particular application, the present invention may be expanded to provide any number of corresponding levels while staying within the scope of the invention.

As mentioned previously, in one application of the present invention, the device employing the invention is preferably a personal pager and includes a microprocessor which must be fully operative for approximately one-fifteenth of a time period and in a standby mode for fourteen-fifteenths of the time period. While in the full power mode, the microprocessor in the device examines received signals for a special code. This code may, for example, warn the device that a message for that device may be forthcoming. If such a code is detected, the device will remain fully powered for some predetermined period of time. Until the code is received, however, the microprocessor will continue the cyclic pattern of full power and standby modes in the ratio of 1 to 14. In the standby mode, the microprocessor may be merely counting time pulses. At each change of mode, the microprocessor sends the appropriate one or zero signal to the DC/DC converter 20 so that the appropriate power made available. It should be observed that the device will again conserve energy by the establishment of the low power mode for fourteen-fifteenths of the time.

Also, in one application regardless of the mode, the microprocessor will send regular pulses to a deadman timer, each pulse indicating that the microprocessor is functioning properly and indicative of correct software execution. If the pulse transitions are not detected or are delayed, the deadman timer will reinitialize the microprocessor and, at the same time provide a signal to ensure the establishment of the high current state of the DC/DC converter 20 required for full operation of the microprocessor.

For additional information on this deadman timer, reference may be made to co-pending application filed concurrently herewith, Ser. No. 192,772, filed Oct. 1, 1980, in the name of Walter L. Davis, et al., entitled "Dual Deadman Timer Circuit" and assigned to the assignee of the present application which is hereby incorporated by reference. Thus, the signal at the state control input 52 may come from either the microprocessor directly, or from the deadman timer in a particular application. For purposes of the present invention, it is only necessary that the signal at the terminal 52 indicate the desired operational state of the DC/DC converter 20, regardless of the source of the signal. The use in the preferred embodiment described above is particularly appropriate, since the microprocessor itself, directly or indirectly, controls its own power supply.

Figure 3:
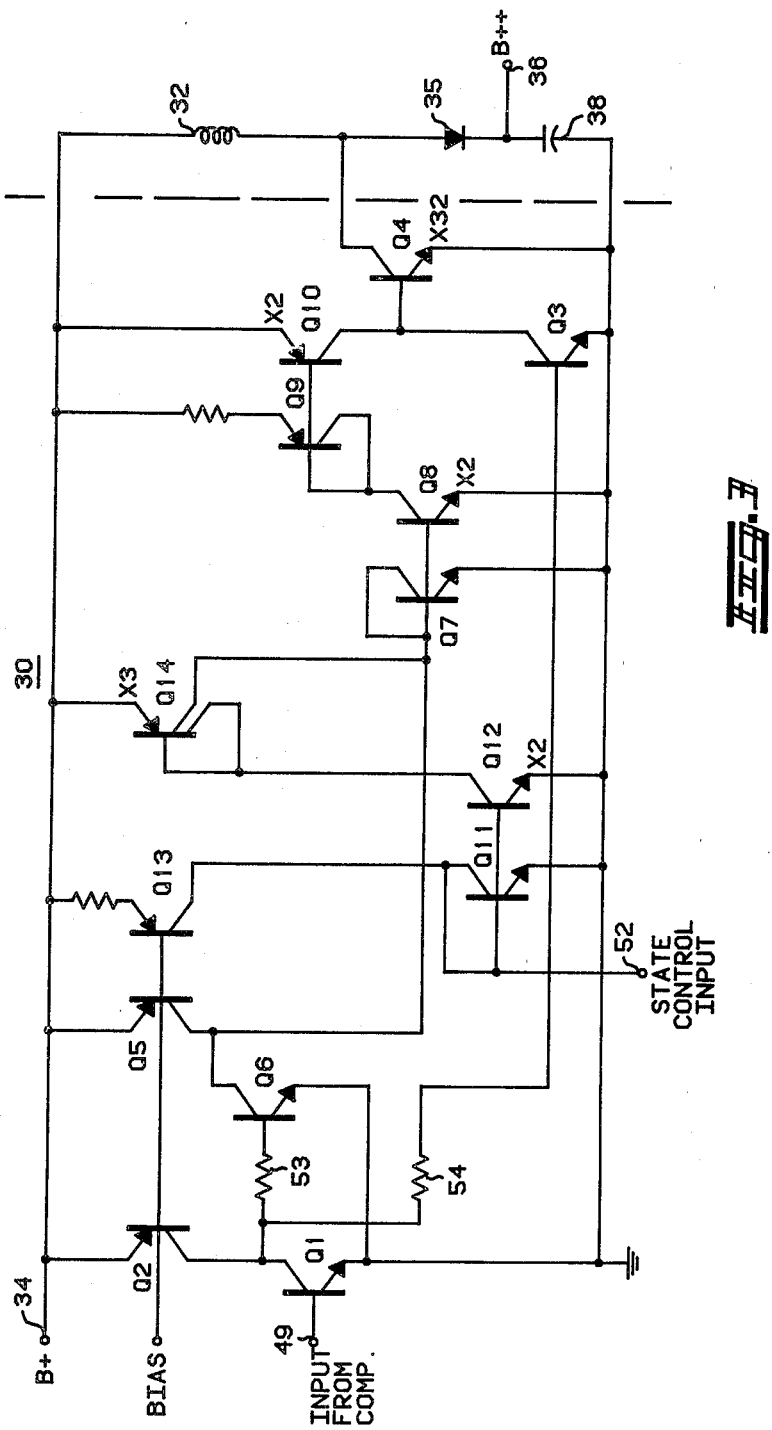
FIG. 3 is an electrical schematic diagram of the coil driver block of FIG. 2.

In the electronic schematic diagram of FIG. 3, the comparator 48 output is coupled to the base of a transistor Q1 via the terminal 49. It will be recalled that this is a pulse width modulated (PWM) signal and is the control signal which keeps the B++ voltage at the desired level; i.e., performs a regulating function. When the PWM signal is low, the Q1 output is high and the current from a current source formed by transistor Q2, via resistors 53 and 54, switches on transistors Q3 and Q6. When transistor Q6 is active, it sinks all of the current provided by current source formed by transistor Q5. When the PWM signal is high, the output of Q1 is low and Q6 and Q3 are cut off. When Q6 is not conducting, the current provided by a current source which includes transistor Q5 is diverted to a current mirror pair, formed by transistors Q7 and Q8. This current mirror multiplies the reference current by a factor of two and a transistor Q8 then sinks this multiplied current from the base of a transistor Q9. Transistors Q9 and Q10 also form a current mirror which has a multiplication factor of greater than ×2. Since transistor Q9 forms a non-linear amplifier, the exact multiplication factor is dependent on the current which is conducted. The amplified current generated by the current mirror Q9 and Q10 is sent to the base of a transistor Q4 which, when cnducting, establishes a current flow in the inductor 32. Thus, when the PWM signal is high, transistor Q4 conducts. When the PWM signal is low, transistor Q4 is cut off.

As was mentioned earlier, the PWM signal going high activates transistors Q1, Q7, Q8, Q9 and Q10 thus providing drive current to the switching transistor Q4. Transistor Q3 is off when transistor Q10 is conducting.

When the PWM signal goes low, transistors Q1, Q7, Q8, Q9 and Q10 turn off and transistor Q3 turns on. When Q3 conducts, it draws all available current from the switching transistor Q4, thus cutting Q4 off and insuring the rapid switching of Q4. Transistor Q4 should be identified with transistor 30 of FIG. 2.

When transistor Q4 conducts, current flow is established in the inductor 32. When Q4 is cut off, the current in the inductor, which cannot change instantaneously, is diverted through the output diode 35 to the load capacitor 38. Since the coil current is changing during this period, a voltage increase is generated across the coil which is significantly higher than the supply voltage.

In the high current state, a high input at the terminal 52 allows the current supplied by a current source, composed of transistor Q13 and a resistor in series with its emitter, to flow through the current mirror formed by transistors Q11 and Q12. This current mirror amplifies this current by ×2 and sinks the multiplied current from the base of the current mirror Q14. This current mirror amplifies this current ×3 and sources the amplified current to the base of Q7. This current is added to the current which is present in the low current state for converter 20.

In the preferred embodiment, current sources Q2 and Q5 supply approximately four microamps. Current source Q13 supplies approximately two microamps. Therefore, the collector current in Q8 will be approximately eight microamps in the low current state and eight microamps plus 24 microamps in the high current state. Since Q9 is a non-linear amplifier, and Q10 provides another current multiplication by two, the base current supplied to Q4 is approximately 250 microamps in the high current state, allowing for full power operation of an associated circuit such as a microprocessor. This value should be compared with the approximate 16 microamps of base current generated in the low current state.

In the high current state, current mirror Q14 supplies a continuous current to the base of Q7, which in turn prevents Q7, Q8, Q9 and Q10 from completely switching off as they do in the low current state. Transistor Q3, which is driven by the PWM signal, either sinks the base current or allows it to flow into the base of Q4. The operation of the coil driver circuit 24 will be discussed further below. Coil 32, diode 35 and capacitor 38 are separated from the remaining portion of the circuit by a broken line as a natural partition to distinguish those components which would not be implemented on an IC.

In FIG. 4, a number of waveforms are given for both the high current and low current states. No scale is to be inferred from the figure. As long as bias current (4A) flows in the base of Q4, the current in the coil 32 (4B) increases. At the cut-off of Q4, the collector voltage of Q4 (4E) rises above B++, and coil current flows through the diode 35 (4C) to charge the capacitor 38. The collector current (4D) and the diode current (4C) are essentially equal to the coil current (4B). While current is flowing in the diode, the Q4 collector voltage (4E) remains at approximately $(B++)+V_d$, where $V_d$ is the drop across diode 35 when it is conducting. The voltage (4F) across the coil 32 is equal to $(B++)-(B+)+V_d$ while the diode 35 is conducting, then drops to $V_{sat}-(B+)$ when Q4 begins to conduct. In the low current mode, a much smaller current (4A') is supplied to the base of Q4 for a shorter pulse, thus the coil current (4B') can not go as high as in 4B.

Figure 5:
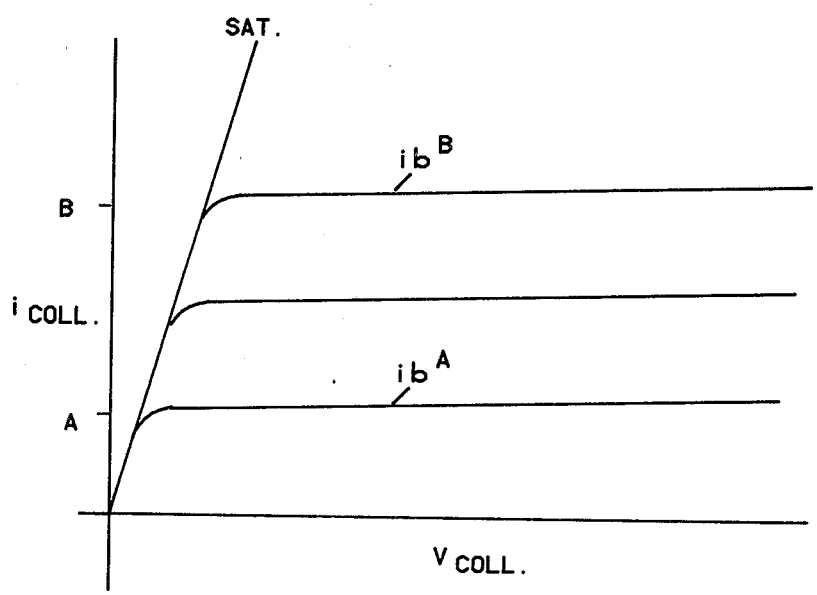
FIG. 5 is the family of curves relating the saturation voltage characteristic to the collector current for the switching transistor.

FIG. 5 shows graphical a representation of the family of $V_{coll}/i_{coll}$ curves. The lower level current pulses of 4A' will allow efficient operation of Q4 with a smaller current drain; i.e., the base current $i_bA$ will allow operation along the saturation current line to the level A on the collector current scale but will not support collector current at level B. The higher current pulses of 4A will allow efficient operation of Q4 with a larger current drain; a base current of $i_bB$ will allow $i_c$ to rise to the level B. In a practical embodiment the two current levels A, B could be approximately 25 microamps and 500 microamps, respectively. It is necessary for Q4 to have a small voltage drop across it to switch the current in coil 32. However, only the current required to saturate Q4 should be applied, otherwise efficiency will be lost.

Figure 6:
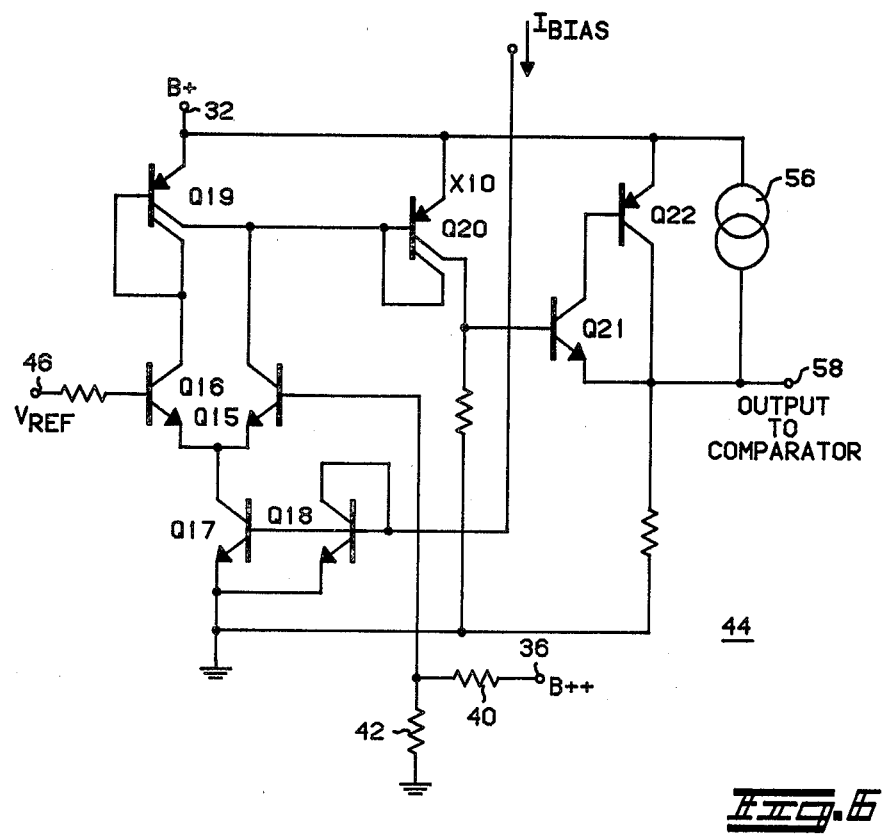
FIG. 6 is an electrical schematic diagram of the error amplifier portion of FIG. 2.

FIG. 6 is an electrical schematic diagram of the error amplifier 44 with the divided-down B++ voltage coupled to transistor Q15 and the reference voltage 46 coupled to transistor Q16, with transistors Q15 and Q16 forming a differential amplifier. Transistors Q17 and Q18 form a mirrored current source for the differential amplifier and transistor Q19 is a current mirror which is coupled to transistor Q20 which, in turn, provides a multiplication factor of ten. Transistors Q21 and Q22 form an output amplifier, and current source 56 adds a small, constant current to the error amplifier output which is then coupled to the comparator 48 via terminal 58. This current source 56 may be one section of current source formed by transistor Q13. The function of current source 56 is to provide a very small current to the output of error amplifier 44. This will insure that the output of the error amplifier never goes below the lowest voltage of the ramp signal, $V_{sat}$ of Q31, so that at least a minimum duty cycle PWM signal will always appear at the output of the comparator 48. This is necessary to insure operation when the system is initially powered up from a zero energy state. The output of the error amplifier 44 represents the difference between B++ and a fixed reference voltage and will be used to maintain B++ at the referenced voltage.

Figure 7:
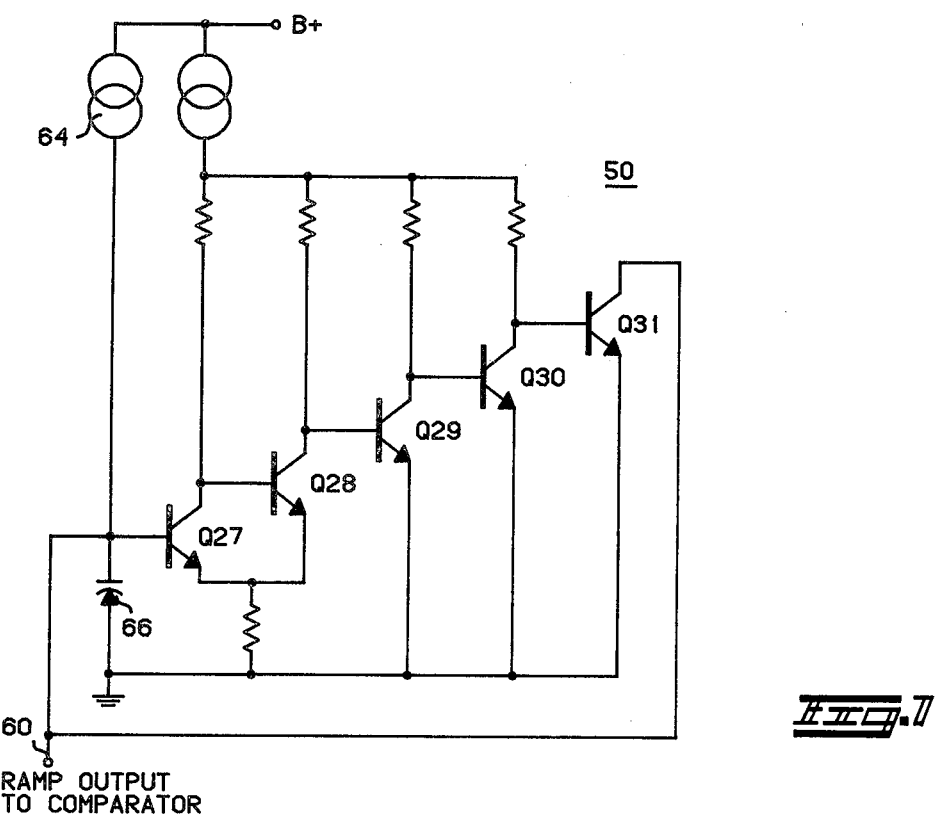
FIG. 7 is an electrical schematic diagram of the ramp generator portion of FIG. 2.

FIG. 7 is a schematic diagram of the ramp generator 50 with a current source 64 which charges a capacitor 66 until transistor Q27 turns on, transistor Q28 turns off, transistor Q29 turns on, transistor Q30 turns off and transistor Q31 turns on. When Q31 turns on, the Q31 output, which is coupled back to capacitor 66, discharges the capacitor and turns of transistor Q27. Thus, because capacitor 66 is charged with a constant current the output of the ramp generator 50 is a constant frequency ramp signal with a steep cut-off and the PWM output of the comparator is also at the same fixed frequency.

Figure 8:
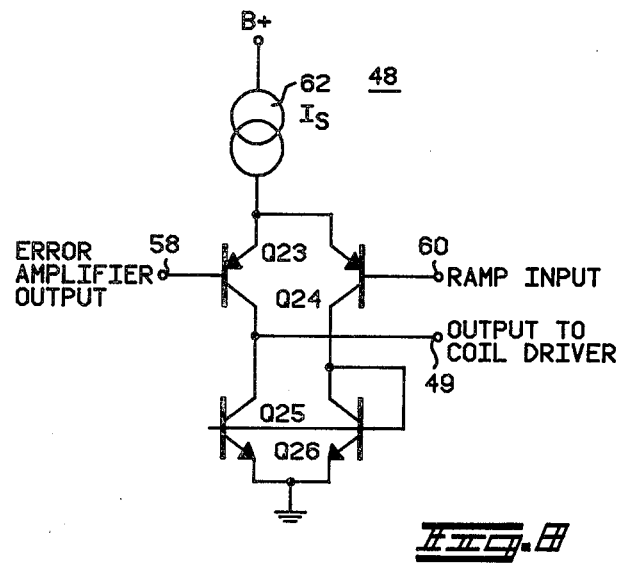
FIG. 8 is an electrical schematic diagram of the comparator portion of FIG. 2.

FIG. 8 is a schematic diagram of the comparator circuit 48, with the output of the error amplifier 44 coupled to terminal 58, the base of transistor Q23. Terminal 60 couples the ramp signal from the ramp generator 50 to the base of transistor Q24. Transistors Q23 and Q24 form a differential amplifier which is fed by a current source 62 and transistors Q25 and Q26 form a current mirror. The output of the comparator 48 is thus a pulse at the frequency of the ramp output signal, with the width of the pulse determined by the error amplifier output signal.

It will be observed from the schematic diagrams that, with the widespread use of current multiplication, the circuits are particularly well suited for an integrated circuit implementation on a small chip area. It is also to be noted that the circuits operate at the one-cell B+ voltage and that performance is not degraded in the low current operational state. In one embodiment, the total current requirements of the ramp generator 50, comparator 48 and error amplifier 44 is only 44 microamps. Overall increase in efficiency due to the circuit of the invention may be as great as 40%.

Thus there has been shown and described a dual mode DC/DC converter which operates at peak efficiency in two distinct current level states. The current states are controlled externally in response to the operating mode of the associated device, and may be controlled by more than one portion of the device. Obviously, many variations of the specific illustrations shown are possible and it is intended to cover all such as fall within the spirit and scope of the appended claims.

What is claimed is:

1. A dual state DC/DC converter for supplying power at two output current levels comprising:
    power input means for receiving power at a first predetermined voltage;
    current-controlled means coupled to the power input means for providing output power at a second predetermined voltage, the second predetermined voltage being greater than the first predetermined voltage, said output current level being directly related to the magnitude of control current;
    first enabling means coupled to the current-controlled means for enabling sufficient control current for the lower of said two output current levels;
    second enabling means coupled to the current-controlled means for enabling an amount of control current for the higher of said two output current levels; and
    input circuit means for receiving an input signal indicative of the current level required of the current-controlled means, said input circuit means being coupled to the enabling means for selectively actuating either enabling means in response to a predetermined level of the input signal.

2. A converter in accordance with claim 1 wherein the current-controlled means includes a switching transistor, and the first and second enabling means supply base current for the transistor.

3. A converter in accordance with claim 1 wherein the current-controlled means includes inductance means coupled to receive energy from the power input means, capacitance means coupled to receive energy from the inductance means, and diode means coupled between the inductance means and the capacitance means.

4. A converter in accordance with claim 1 and further including regulating means coupled between the current-controlled means and the first and second enabling means for maintaining the output substantially at the second predetermined voltage.

5. A converter in accordance with claim 4 wherein the regulating means includes a voltage reference source, comparator means for comparing the output voltage with the reference voltage to provide an error signal indicative of the difference between said two voltages, and means for controlling the enabling means in response to the error signal.

6. A converter in accordance with claim 5 wherein the controlling means includes a ramp generator means and second comparator means for comparing the error signal to the ramp generating means output.

7. A dual power state DC/DC converter for use in a device including a dual power mode microprocessor having two output current demand levels, the converter comprising:
    power input means for receiving power at a first predetermined voltage:
    current-controlled means coupled to the power input means for providing output power to the microprocessor at a second predetermined voltage, the second predetermined voltage being greater than the first predetermined voltage, said output current level being directly related to the magnitude of control current;
    first enabling means coupled to the current-controlled means for enabling sufficient control current for the lower of said output current demand levels;
    second enabling means coupled to the current-controlled means for enabling an amount of control current for the higher of said two output current demand levels; and
    input circuit means, for receiving an input signal from the microprocessor indicative of the microprocessor power requirement, and coupled to the enabling means for selectively enabling the second enabling means in response to a predetermined level of the input signal, whereby the higher of said power states of said converter is established.

8. A converter in accordance with claim 7 wherein the current-controlled means includes a transistor and a diode, the coil means is coupled into the transistor collector circuit, the first and second current enabling means are coupled into the transistor base circuit and the capacitor means is coupled to the coil means through the diode means.

9. A converter in accordance with claim 7 further including a reference voltage source and means for comparing the power output voltage with the reference voltage.

10. A converter in accordance with claim 7 further including a reference voltage source, first comparator means for comparing the power output voltage with the reference voltage, a ramp signal source, and second comparator means for comparing the ramp signal with the output signal of the first comparator means.

11. A converter in accordance with claim 10 wherein the ramp signal is at a fixed frequency.

12. A dual state DC/DC converter comprising:
power input means for receiving power at a first predetermined voltage;
coil means coupled to the power input means;
current-controlled switching means coupled to the coil means for interrupting current flow in the coil means;
capacitor means coupled to the coil means for storing energy from the coil means when current flow to the coil means is interrupted;
first current enabling means coupled to the switching means providing a first control current;
second current enabling means coupled to the switching means providing a second control current of magnitude different than said first control current;
output means coupled to the capacitor means for providing a power output at a second predetermined voltage, the second voltage being greater than the first predetermined voltage, said output power being directly related to the magnitude of control current;
signal input means coupled to the current enabling means for selectively actuating either current enabling means in response to a predetermined input signal; and
pulse width modulation means responsive to time interval signals coupled to the output means to activate the selected current enabling means in response to the level of the output voltage.

13. A dual state DC/DC converter for supplying power at two output current levels comprising:
a limited capacity battery capable of supplying a first predetermined voltage;
current-responsive power control means coupled to the battery for providing output power at a second predetermined voltage, the second predetermined voltage being greater than the first predetermined voltage, said output current level being directly related to the magnitude of control current;
first current means coupled to the current-responsive power control means for supply sufficient control current to establish the lower of said two output current levels;
second current means coupled to the current-responsive power control means for supplying an additional amount of control current to establish the higher of two output current levels; and
switching means receiving an input signal indicative of the output current level demanded of the converter, said switching means selectively actuating either current means in response to the input signal.

14. The converter of claim 13 wherein said limited capacity battery is a single cell battery.

15. The converter of claim 14 wherein said current responsive power control means includes a switching transistor and said first current means supplies only sufficient current to saturate the transistor and enable a switching function.

16. The converter of claim 15 wherein said switching means is actuated upon receiving a predetermined level of said input signal.

17. A dual power state DC/DC converter for use in a communications device including a dual power mode microprocessor having two output current demand levels, the converter comprising:
a limited capacity battery capable of supply a first predetermined voltage;
current-controlled means coupled to the battery for providing output power to the microprocessor at a second predetermined voltage, the second predetermined voltage being greater than the first predetermined voltage, said output current level being directly related to the magnitude of a control current;
first current means coupled to the current-controlled means supplying sufficient control current for the lower of said output current demand levels;
second current means coupled to the current-controlled means for supplying an additional amount of control current for the higher of said two output current demand levels; and
input circuit means, for receiving an input signal from the microprocessor indicative of the microprocessor power mode and coupled to the second current means for selectively enabling the second current means in response to the input signal, whereby the higher of said power states of said converter is established to supply the higher of said output current demand levels of the microprocessor.

18. The converter of claim 17 wherein said limited capacity battery is a single cell battery.

19. The converter of claim 17 wherein said current responsive power control means includes a switching transistor and said first current means supplied only sufficient current to saturate the transistor and enable a switching function.

20. The converter of claim 19 wherein said switching means is actuated upon receiving a predetermined level of said input signal.

* * * * *